(12) United States Patent
Huang et al.

(10) Patent No.: US 11,434,411 B2
(45) Date of Patent: *Sep. 6, 2022

(54) GRAPHENE OXIDE JANUS NANOSHEETS RELATIVE PERMEABILITY MODIFIER (RPM) FOR REDUCING SUBTERRANEAN FORMATION WATER PERMEABILITY IN CARBONATE FORMATIONS

(71) Applicant: Saudi Arabian Oil Company, Dhahran (SA)

(72) Inventors: Jin Huang, Dhahran (SA); Feng Liang, Cypress, TX (US); Wengang Li, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 142 days.

This patent is subject to a terminal disclaimer.

(21) Appl. No.: 16/904,174

(22) Filed: Jun. 17, 2020

(65) Prior Publication Data
US 2021/0395600 A1    Dec. 23, 2021

(51) Int. Cl.
*C09K 8/516* (2006.01)
*C01B 32/194* (2017.01)
(Continued)

(52) U.S. Cl.
CPC .......... *C09K 8/516* (2013.01); *C01B 32/194* (2017.08); *C01B 32/198* (2017.08); *C09K 8/502* (2013.01);
(Continued)

(58) Field of Classification Search
CPC .......... C01B 2204/04; C01B 2204/32; C01B 32/194; C01B 32/198; C01P 2004/24;
(Continued)

(56) References Cited

U.S. PATENT DOCUMENTS

| 7,552,771 B2 | 6/2009 | Eoff et al. |
| 9,228,940 B2 | 1/2016 | Pelletier et al. |

(Continued)

FOREIGN PATENT DOCUMENTS

| JP | 2020522452 A | 7/2020 |
| WO | 2017011328 A1 | 1/2017 |
| WO | 2019027817 A1 | 2/2019 |

OTHER PUBLICATIONS

U.S. Appl. No. 16/904,211, filed Jun. 17, 2020 and titled "Silicon Dioxide Janus Nanosheets Relative Permeability Modifier (RPM) for Reducing Subterranean Formation Water Permeability in Carbonate and Sandstone Formations".

(Continued)

*Primary Examiner* — Frances Tischler
(74) *Attorney, Agent, or Firm* — Bracewell LLP; Constance G. Rhebergen; Brian H. Tompkins

(57) ABSTRACT

A graphene oxide Janus nanosheets relative permeability modifier (RPM) for carbonate formations. The graphene oxide Janus nanosheets RPM may be used to treat a water and hydrocarbon producing carbonate formation to reduce water permeability in the formation and increase the production of hydrocarbons. The graphene oxide Janus nanosheet RPM includes a first side having negatively charged functional groups and a second side having alkyl groups. The alkyl groups may include C8 to C30 alkyls. The negatively charged functional groups may include carboxyl groups, epoxy groups, and hydroxyl groups. Methods of reducing water permeability of a carbonate formation using the graphene oxide Janus nanosheets RPM and methods of manufacturing the graphene oxide Janus nanosheets RPM are also provided.

4 Claims, 5 Drawing Sheets

(51) Int. Cl.
| | |
|---|---|
| *C01B 32/198* | (2017.01) |
| *C09K 8/502* | (2006.01) |
| *C09K 8/506* | (2006.01) |
| *E21B 43/16* | (2006.01) |

(52) U.S. Cl.
CPC .............. *C09K 8/506* (2013.01); *E21B 43/16* (2013.01); *C01B 2204/04* (2013.01); *C01B 2204/32* (2013.01); *C01P 2004/24* (2013.01); *C09K 2208/10* (2013.01)

(58) Field of Classification Search
CPC ...... C09K 2208/10; C09K 8/03; C09K 8/502; C09K 8/5045; C09K 8/506; C09K 8/516; E21B 43/16
See application file for complete search history.

(56) References Cited

U.S. PATENT DOCUMENTS

| | | | |
|---|---|---|---|
| 9,484,079 | B2 | 11/2016 | Lee |
| 9,708,525 | B2 | 7/2017 | Suresh et al. |
| 9,708,896 | B2 | 7/2017 | Suresh et al. |
| 9,784,079 | B2 | 10/2017 | Salla et al. |
| 9,790,415 | B1 | 10/2017 | Jiang et al. |
| 10,036,239 | B2 | 7/2018 | Salla et al. |
| 10,053,613 | B1 | 8/2018 | Kalgaonkar |
| 11,261,368 | B2 | 3/2022 | Huang et al. |
| 2012/0015852 | A1 | 1/2012 | Quintero et al. |
| 2012/0245058 | A1 | 9/2012 | Monteiro et al. |
| 2014/0015896 | A1 | 1/2014 | Katoh |
| 2017/0015896 | A1 | 1/2017 | Cox et al. |
| 2017/0204718 | A1 | 7/2017 | Pearl, Jr. et al. |
| 2017/0218250 | A1 | 8/2017 | Boul et al. |
| 2018/0086971 | A1 | 3/2018 | Al-Muntasheri et al. |
| 2018/0320053 | A1 | 11/2018 | Kalgaonkar et al. |
| 2018/0327649 | A1 | 11/2018 | Kalgaonkar |
| 2018/0327652 | A1 | 11/2018 | Kuznetsov et al. |
| 2019/0010377 | A1 | 1/2019 | Boul et al. |
| 2019/0010382 | A1 | 1/2019 | Kuznetsov et al. |
| 2019/0016943 | A1 | 1/2019 | Ren et al. |
| 2020/0377675 | A1 | 12/2020 | Ren et al. |
| 2021/0107798 | A1 | 4/2021 | Wang |
| 2021/0395093 | A1 | 12/2021 | Huang et al. |
| 2021/0395098 | A1 | 12/2021 | Huang et al. |
| 2021/0395601 | A1 | 12/2021 | Huang et al. |

OTHER PUBLICATIONS

U.S. Appl. No. 16/904,253, filed Jun. 17, 2020 and titled "Methods and Compositions for Treating Thief Zones in Carbonate Formations Using Crosslinked Polymeric Systems with Graphene Oxide Janus Nanosheets Crosslinker".

U.S. Appl. No. 16/904,275, filed Jun. 17, 2020 and titled "Methods and Compositions for Treating Thief Zones in Carbonate Formations Using Crosslinked Polymeric Systems with Silicon Dioxide Janus Nanosheets Crosslinker".

Babaei, M. et al.; "Promising gene delivery system based on polyethylenimine-modified silica nanoparticles" Cancer Gene Therapy (2017) 00; pp. 1-9.

Buchman, Yekaterina Kapilov et al.; "Silica Nanoparticles and Polyethyleneimine (PEI)-Mediated Functionalization: A New Method of PEI Covalent Attachment for siRNA Delivery Applications" Bioconjugate Chem. Nov. 4, 2013; pp. 1-41.

Gao, Tao et al.; "Monodisperse Hollo Silica Nanospheres for Nano Insulation Materials: Synthesis, Characterization, and Life Cycle Assessment" ACS Appl. Mater. Interfaces 2013, 5; pp. 761-767.

Guo, Qian et al.; "Effects of Surface-Modified Alkyl Chain Length of Silica Fillers on the Rheological and Thermal Mechanical Properties of Underfill" IEEE Trans. on Components, Packaging & Man. Tech., vol. 6, No. 12, Dec. 2016; pp. 1796-1803.

Hummers, William S. et al.; "Preparation of Graphitic Oxide" JACS, Mar. 20, 1958, 80; p. 1339.

Liang, Feng et al.; "Reduced-Polymer-Loading, High-Temperature Fracturing Fluids by Use of Nanocrosslinkers" SPE 177469, Apr. 2017 SPE Journal; pp. 622-631.

Liang, Fuxin et al.; "Inorganic Janus Nanosheets" Agnew. Chem. Int. Ed. 2011, 50; pp. 2379-2382.

Liang, Fuxin et al.; "Janus hollow spheres by emulsion interfacial self-assembled sol-gel process" Chem. Commun., 2011, 47; pp. 1231-1233.

Luo, Dan et al.; "Nanofluid of graphene-based amphiphilic Janus nanosheets for tertiary or enhanced oil recovery: High performance at low concentration" PNAS Jul. 12, 2016, vol. 113, No. 28; pp. 7711-7716.

Luo, Dan et al.; "Secondary Oil Recovery Using Graphene-based Amphiphillic Janus Nanosheet Fluid at Ultralow Concentration" Industrial & Engineering Chemistry Research, 56 (39), 2017; pp. 11125-11132.

Sandberg, Linn Ingunn C. et al.; "Synthesis of Hollow Silica Nanospheres by Sacrificial Polystyrene Templates for Thermal Insulation Applications" Advances in Materials Science & Engineering vol. 2013, Art ID 483651; pp. 1-6.

Sheng, Li et al.; "Janus Silica Hollow Spheres Prepared via Interfacial Biosilicification" American Chemical Society, Langmuir 2015, 31; pp. 11964-11970.

Wu, Hao et al; "Janus graphene oxide nanosheets prepared via Pickering emulsion template" Carbon 93, 2015; pp. 473-483.

Yin, Taiheng et al.; "Physicochemical properties and potential applications of silica-based amphiphilic Janus nanosheets for enhanced oil recovery" Fuel 237 (2019); pp. 344-351.

Zhao, Xubo et al.; "Biocompatible graphene oxide as a folate receptor—targeting drug delivery system for the controlled release of anti-cancer drugs" Royal Soceity of Chemistry Adv., 2014, 4; pp. 24232-24239.

International Search Report and Written Opinion for International Application No. PCT/US2021/037888, report dated Sep. 22, 2021; pp. 1-16.

International Search Report and Written Opinion for International Application No. PCT/US2021/037897, report dated Sep. 21, 2021; pp. 1-15.

International Search Report and Written Opinion for International Application No. PCT/US2021/037908, report dated Sep. 16, 2021, pp. 1-15.

Luo, Dan et al.; "Synthesis of graphene-based amphiphilic Janus nanosheets via manipulation of hydrogen bonding" Carbon 126, 2018; pp. 105-110.

Zhao, Ziguang et al.; "Dually Responsive Janus Composite Nanosheets" Macromolecules, vol. 48, No. 11, ACS Publications, American Chemical Society, May 29, 2015; pp. 3598-3603.

International Search Report and Written Opinion for International Application No. PCT/US2021/037900 report dated Sep. 21, 2021; pp. 1-13.

GRAPHENE OXIDE JANUS NANOSHEETS RELATIVE PERMEABILITY MODIFIER (RPM) FOR REDUCING SUBTERRANEAN FORMATION WATER PERMEABILITY IN CARBONATE FORMATIONS

BACKGROUND

Field of the Disclosure

The present disclosure generally relates to the production of hydrocarbons such as oil and gas from subterranean formations. More specifically, embodiments of the disclosure relate to water control in subterranean wells for production of hydrocarbons.

Description of the Related Art

Water control presents a significant challenge in the production of hydrocarbons, both financially and environmentally. For example, under some estimations it requires at least the same amount of energy to produce a barrel of water as it does to recover a barrel of oil. Excess water production detrimentally affects the economic life of hydrocarbon producing wells and also causes many other oilfield-related problems, such as scale deposition, fines migration, corrosion, etc.

SUMMARY

In the past decades, many different techniques have been developed to control water production in hydrocarbon wells. Such techniques including mechanical isolation and chemical treatments. A Relative Permeability Modifier (RPM), among other chemical material systems, is considered as one technique of controlling unwanted water production in hydrocarbon reservoirs. An RPM treatment is generally in the form of solution of low viscosity and, can be pumped into a hydrocarbon formation, typically by bullhead injection or as fracture additives, to reduce water permeability without significantly affecting oil permeability.

An RPM treatment may be applied directly to producing wells and, in some instances, to injection wells. The simplicity of deployment (for example, bullhead injection requires no zonal isolation) and capability of disproportionate permeability reduction may render RPM an advantageous water control method to cut production costs in those environments where zones cannot be mechanically isolated or permanent total blockage is not possible.

However, the majority of the commercially available water control chemicals, including RPMs, are designed for sandstone formations and not suitable for carbonate formations. The available water control chemicals not designed to form chemical bonds to the carbonate rock surface under reservoir conditions. Consequently, there is a need for an improved chemicals and techniques for controlling water production in carbonate reservoirs.

In one embodiment a graphene oxide Janus nanosheet relatively permeability modifier (RPM) for carbonate formations is provided. The graphene oxide Janus nanosheet RPM includes a graphene oxide nanosheet having a first side and a second side and a first alkyl group bonded to the first side, the first alkyl group selected from the group consisting of a C1-C8 alkyl. The graphene oxide Janus nanosheet RPM further includes a functional group bonded to the first alkyl group, the functional group selected from the group consisting of COOH, COO$^-$, OH, and O$^-$, and a second alkyl group bonded to the second side, the second alkyl group selected from the group consisting of a C8-C30 alkyl.

In some embodiments, the first alkyl group is bonded to the first side by an oxygen atom. In some embodiments, the second alkyl group is bonded to the second side by a nitrogen atom. In some embodiments, the degree of hydrophobic alkyl functionality of the second side is in the range of 0.01 weight (wt) % to 20 wt %. In some embodiments, the graphene oxide nanosheet has a thickness in the range of 1 nanometer (nm) to 10 microns (µm). In some embodiments, the graphene oxide nanosheet has a lateral dimension in the range of 20 nanometers (nm) to 50 microns.

In another embodiment, a method for reducing water permeability of a carbonate formation is provided. The method includes introducing a carrier fluid and a graphene oxide Janus nanosheet relatively permeability modifier (RPM) into the carbonate formation. The graphene oxide Janus nanosheet RPM includes a graphene oxide nanosheet having a first side and a second side and a first alkyl group bonded to the first side, the first alkyl group selected from the group consisting of a C1-C8 alkyl. The graphene oxide Janus nanosheet RPM further includes a functional group bonded to the first alkyl group, the functional group selected from the group consisting of COOH, COO$^-$, OH, and O$^-$, and a second alkyl group bonded to the second side, the second alkyl group selected from the group consisting of a C8-C30 alkyl.

In some embodiments, the first alkyl group is bonded to the first side by an oxygen atom. In some embodiments, the second alkyl group is bonded to the second side by a nitrogen atom. In some embodiments, the degree of hydrophobic alkyl functionality of the second side is in the range of 0.01 weight (wt) % to 20 wt %. In some embodiments, the graphene oxide nanosheet has a thickness in the range of 1 nanometer (nm) to 10 microns (µm). In some embodiments, the graphene oxide nanosheet has a lateral dimension in the range of 20 nanometers (nm) to 50 microns. In some embodiments, the carrier fluid is a polar solvent. In some embodiments, the polar solvent is water.

In another embodiment, a method of manufacturing a graphene oxide Janus nanosheet relatively permeability modifier (RPM) is provided. The method includes obtaining a graphene oxide nanosheet having a first side and a second side and preparing a graphene oxide coated wax microsphere using the graphene oxide nanosheet, the graphene oxide coated wax microsphere having an exterior surface that is the first side of the graphene oxide nanosheet. The method further includes functionalizing the exterior surface of the graphene oxide coated wax microsphere using an alkylamine and dissolving the alkylamine-functionalized graphene oxide coated wax microsphere to produce an intermediate graphene oxide nanosheet having a first side functionalized by the alkylamine and a second side. The method also includes converting a group on the second side of the intermediate graphene oxide nanosheet using chloroacetic acid to produce a graphene oxide Janus nanosheet RPM. The graphene oxide Janus nanosheet RPM includes a first alkyl group bonded to the first side, the first alkyl group selected from the group consisting of a C1-C8 alkyl. The graphene oxide Janus nanosheet RPM further includes a functional group bonded to the first alkyl group, the functional group selected from the group consisting of COOH, COO$^-$, OH, and O$^-$, and a second alkyl group bonded to the second side, the second alkyl group selected from the group consisting of a C8-C30 alkyl.

In some embodiments, the first alkyl group is bonded to the first side by an oxygen atom. In some embodiments, the second alkyl group is bonded to the second side by a nitrogen atom. In some embodiments, the degree of hydrophobic alkyl functionality of the second side is in the range of 0.01 weight (wt) % to 20 wt %. In some embodiments, preparing the graphene oxide coated wax microsphere using the graphene oxide nanosheet includes emulsifying a mixture of the graphene oxide nanosheet, deionized water, hydrochloric acid, and wax using a homogenizer and neutralizing the mixture with a base after emulsifying. In some embodiments, the alkylamine is dodecylamine. In some embodiments, dissolving the alkylamine-functionalized graphene oxide coated wax microsphere to produce an intermediate graphene oxide nanosheet includes dissolving the alkylamine-functionalized graphene oxide coated wax microsphere in chloroform. In some embodiments, converting a group on the second side of the intermediate graphene oxide nanosheet using chloroacetic acid includes ultrasonicating an aqueous suspension of the intermediate graphene oxide nanosheet for a time period and mixing the aqueous suspension of the intermediate graphene oxide nanosheet with the chloroacetic acid and sodium hydroxide

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a graphene oxide (GO) Janus nanosheet relatively permeability modifier (RPM) for carbonate formations. The graphene oxide Janus nanosheet RPM may be used to treat a water and hydrocarbon producing carbonate formation to reduce water permeability in the formation and increase the production of hydrocarbons. The graphene oxide Janus nanosheet RPM includes a hydrophobic side having alkyl groups and an anionic side having negatively charged groups. As discussed in the disclosure, the alkyl groups may include C8 to C30 alkyls. The negatively charged groups may include carboxyl groups (COOH), epoxy groups ($O^-$), and hydroxyl (OH) groups.

The graphene oxide Janus nanosheet RPM may be introduced into a carbonate formation such that the anionic side attaches to the rock surface of pores of the carbonate formation via an ionic bond between the negatively charged groups and the positively charged calcium ions ($Ca^{2+}$) on the rock surface. The hydrophobic (opposite) side of the graphene oxide Janus nanosheet RPM faces the pore space. When water invades the pore space, the hydrophobic alkyl groups collapse and from a water resistant barrier in the pore space that impedes or completely blocks flow of the water. When oil invades the pore space, the hydrophobic alkyl groups extend and are soluble in the oil, enabling flow of the oil through the pore space.

The graphene oxide Janus nanosheet RPM may be synthesized from a graphene oxide nanosheet obtained commercially or from graphite powder via known processes. The hydrophobic side of the graphene oxide Janus nanosheet RPM may be prepared by producing graphene oxide coated wax microspheres from the graphene oxide nanosheet and functionalizing the exterior surface of the graphene oxide coated wax microsphere using an alkylamine. The opposite anionic side of the graphene oxide Janus nanosheet RPM may be prepared by converting some of the hydroxyl and epoxide groups to carboxyl groups using a chloro-alkyl carboxylic acid such as chloroacetic acid ($ClCH_2COOH$).

Structure of Graphene Oxide Janus Nanosheets RPM

Figure 1:
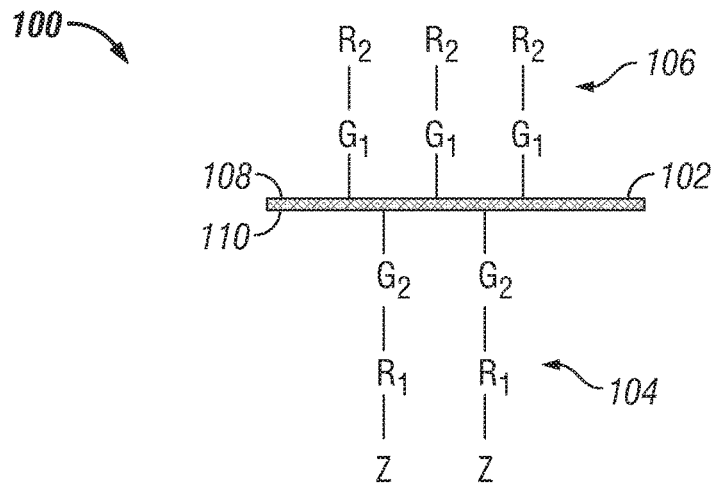
FIG. 1 shows the chemical structure of a graphene oxide Janus nanosheets relatively permeability modifier (RPM) in accordance with an embodiment of the disclosure.

FIG. 1 shows the structure of a graphene oxide Janus nanosheet relatively permeability modifier (RPM) 100 in accordance with an embodiment of the disclosure. As discussed in the disclosure the graphene oxide Janus nanosheet RPM may reduce water permeability in subterranean carbonate formations and improve hydrocarbon production from such formations.

As shown in FIG. 1, the graphene oxide Janus nanosheet 100 includes a graphene oxide nanosheet 102 having a first side 104 (also referred to as the "anionic" side) that includes negatively charged functional groups and a second and opposite side 106 (referred to as the "hydrophobic" side) having hydrophobic functional groups. As used in the disclosure, term "negatively charged groups" may include groups that ionize by releasing a hydrogen (H) atom as a free proton. As discussed infra, the first side 104 that includes negatively charged groups enables the graphene oxide Janus nanosheet 100 to attach to the rock surface of a carbonate formation via interaction with calcium ions ($Ca^{2+}$) present on the carbonate rock surface. The second side 106 having hydrophobic functional groups provides a hydrophobic surface to control oil and water flow. In some embodiments, the graphene oxide nanosheet 102 has a lateral dimension in the range of 20 nanometers (nm) to 50 microns, and a thickness in the range of 1 nanometer (nm) to 10 microns (μm).

As first shown in FIG. 1, the first side 104 includes groups $G_2$ bonded to a 108 surface of the graphene oxide nanosheet 102, groups $R_1$ bonded to groups $G_2$, and groups Z bonded to groups $G_2$. $G_2$ is an oxygen atom (O). $R_1$ is selected from the group consisting of C1 to C8 alkyls (that is an alkyl group having a number of carbon atoms in the range of 1 to 8). Z are selected from the group consisting of carboxyl (COOH and $COO^-$), hydroxyl (OH), and epoxy ($O^-$).

As also shown in FIG. 1, the second side 106 includes groups $G_1$ bonded to the opposite surface 110 of the graphene oxide nanosheet 102 and groups $R_2$ bonded to groups $G_1$. $G_1$ is a nitrogen atom (N). $R_2$ is selected from the group consisting of C8 to C30 alkyls (that is an alkyl group having a number of carbon atoms in the range of 8 to 30). The degree of hydrophobic alkyl chain functionality provided by the $R_2$ groups may be in the range of 0.01 weight (wt) % to 20 wt %.

Process for Using Graphene Oxide Janus Nanosheets RPM

Figure 2:
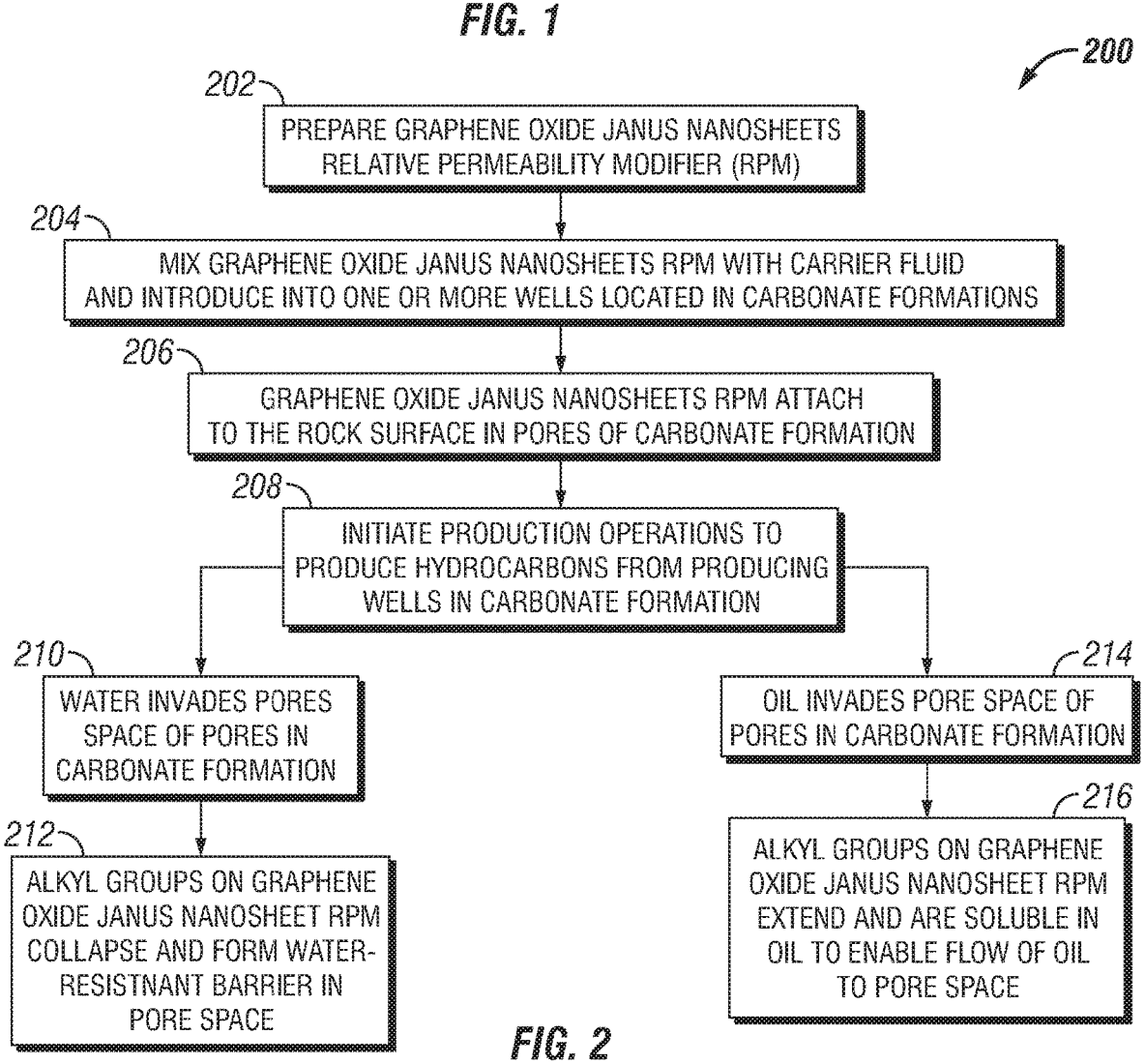
FIG. 2 is a block diagram of a process for using a graphene oxide Janus nanosheets RPM in accordance with an embodiment of the disclosure.

FIG. 2 depicts a process 200 for using the graphene oxide Janus nanosheets RPM in accordance with an embodiment of the disclosure. Initially, graphene oxide Janus nanosheets may be prepared (block 202). The graphene oxide Janus nanosheets may be prepared at a wellsite or, in some embodiments, prepared offsite and then transported to the wellsite. Next, the graphene oxide Janus nanosheets may be mixed with a carrier fluid and introduced into one or more wells located in carbonate formations (block 204). The carrier fluid may be a polar solvent (for example, water). In some embodiments, the graphene oxide Janus nanosheets may be introduced via bullhead injection. The one or more wells may include producing wells, injection wells, or a combination thereof.

After injection, the graphene oxide Janus nanosheets RPM may attach to the rock surface in pores and other openings in the carbonate formation (block 206) due to the ionic interaction between the negatively charged side of the graphene oxide Janus nanosheets RPM and the positively charged calcium ions ($Ca^{2+}$) on the rock surface, such that the alkyl group side of the graphene oxide Janus nanosheets is oriented outward away from the rock surface (for example, toward the pore space of a pore in the rock).

Next, production operations may be initiated (block 208) to produce hydrocarbons from a hydrocarbon-bearing carbonate formation with reduced water production from the one or more wells having the graphene oxide Janus nanosheets RPM. When water invades openings (such as pores) in the carbonate formation rock (block 210), the hydrophobic alkyl groups collapse and from a water resistant barrier in the openings (such as in the pore space) that impedes or completely blocks flow of the water (block 212). When oil invades the openings (block 214), the hydrophobic alkyl groups extend and are soluble in the oil, enabling flow of the oil through the openings (block 216).

Figure 3:
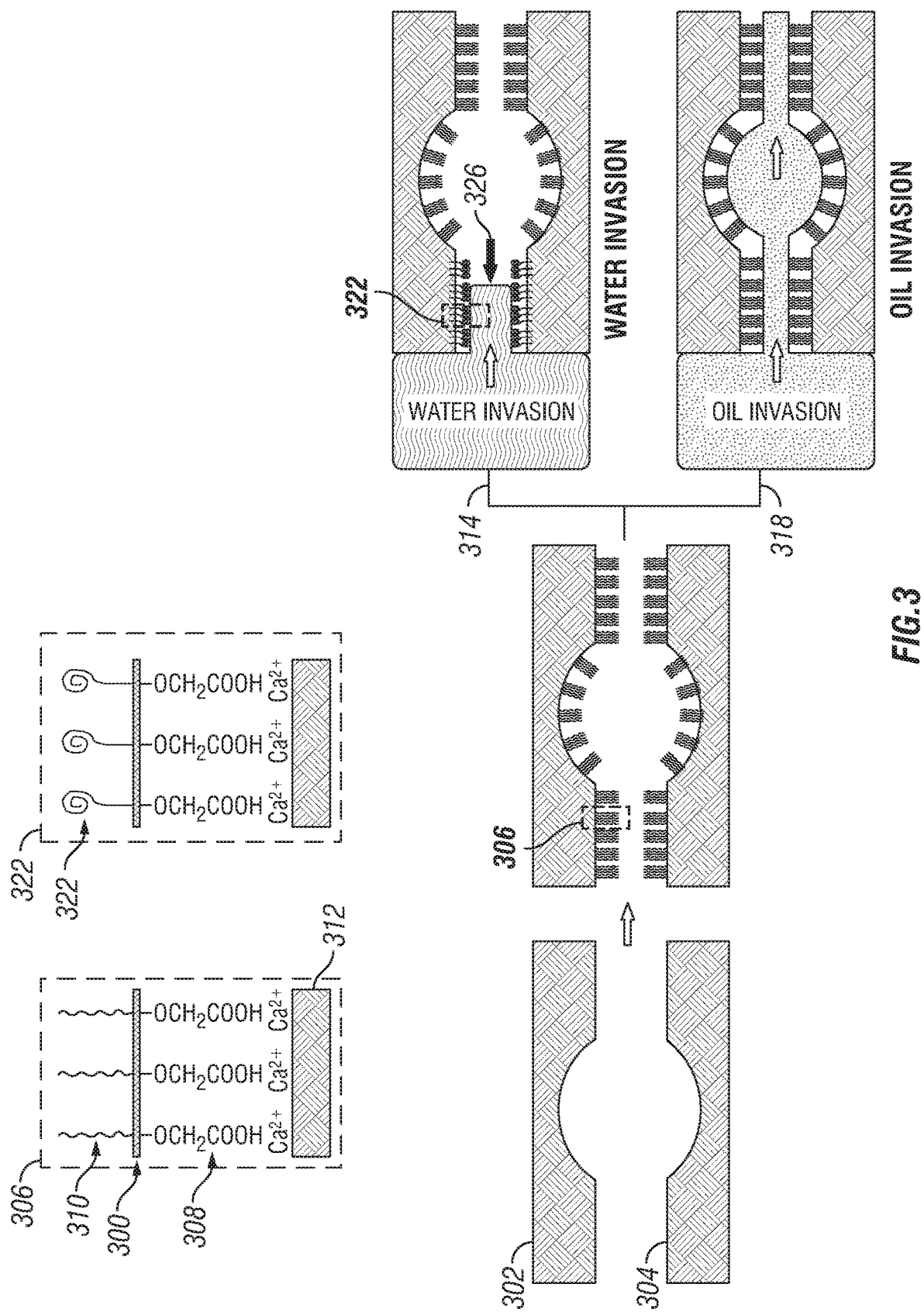
FIG. 3 is a schematic diagram depicting the mechanism of a graphene oxide Janus nanosheets RPM in a carbonate formation in accordance with an embodiment of the disclosure.

FIG. 3 depicts the mechanism of a graphene oxide Janus nanosheets RPM 300 in a carbonate rock 302 in accordance with an embodiment of the disclosure. FIG. 3 illustrates a pore 304 in the carbonate formation 302 that enables the flow of hydrocarbons from a hydrocarbon reservoir located in the formation 302. As will be appreciated, such formations may also produce water. As described in the disclosure, the graphene oxide Janus nanosheets RPM 300 may modify the permeability of the pore 304 to decrease the permeability of the pore 304 to water and without decreasing the permeability of the pore 304 to hydrocarbons.

As shown in inset 306 in FIG. 3, the graphene oxide Janus nanosheets RPM 300 includes a first side 308 having negatively charged groups (by way of example, only carboxyl groups are shown in FIG. 3) and a second opposite side 310 having alkyl groups. As discussed in the disclosure, the first side 308 may include carboxyl, hydroxyl, and epoxy groups, but for clarity only the carboxyl groups are illustrated in FIG. 3. As also shown in inset 306, the first side 308 interacts with the calcium ions ($Ca^{2+}$) on the surface 312 of the carbonate formation 302 to attach the first side 308 of the graphene oxide Janus nanosheets RPM 300 to the carbonate formation. After attaching the graphene oxide Janus nanosheets RPM 300 to the carbonate formation, the second side 310 of the graphene oxide Janus nanosheets RPM 300 is oriented toward the pore space of the pore 304.

As illustrated in FIG. 3, the graphene oxide Janus nanosheets RPM 300 provides different permeability of the carbonate formation 302 depending on the fluid (that is, water or oil) in the channel 304. Line 314 is directed to the mechanism of the graphene oxide Janus nanosheets RPM 300 when water 316 is invading the pore 304, and line 318 of FIG. 3 is directed to the mechanism of the graphene oxide Janus nanosheets RPM 300 when oil 320 is invading the channel 304.

As shown in inset 322, when the water 316 is in the pore 304, the hydrophobic alkyl groups collapse and from a water resistant barrier 324 in the pore space of the pore 304 that impedes or completely blocks flow of the water 316. In some instances, after collapse of the alkyl groups, a capillary effect may act to flow the water 316 in the opposite direction of the water invasion, as shown by arrow 326.

As shown by line 318, when oil 320 is in the pore 304, the hydrophobic alkyl groups extend and are soluble in the oil 320, enabling flow of the oil 310 in the pore space of the pore 304.

Synthesis of Graphene Oxide Janus Nanosheet RPM

Figure 4:
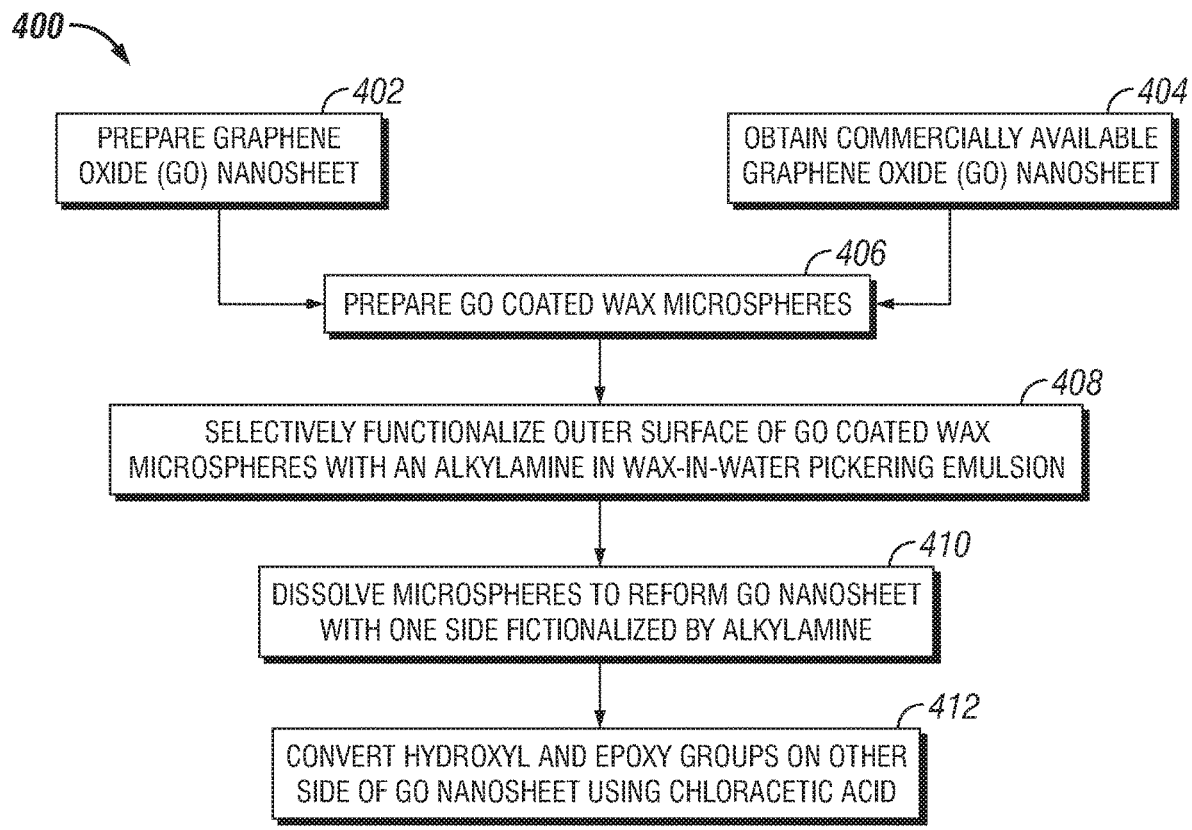
FIG. 4 a block diagram of a process for the synthesis of a graphene oxide nanosheet RPM in accordance with an embodiment of the disclosure.
Figure 5:
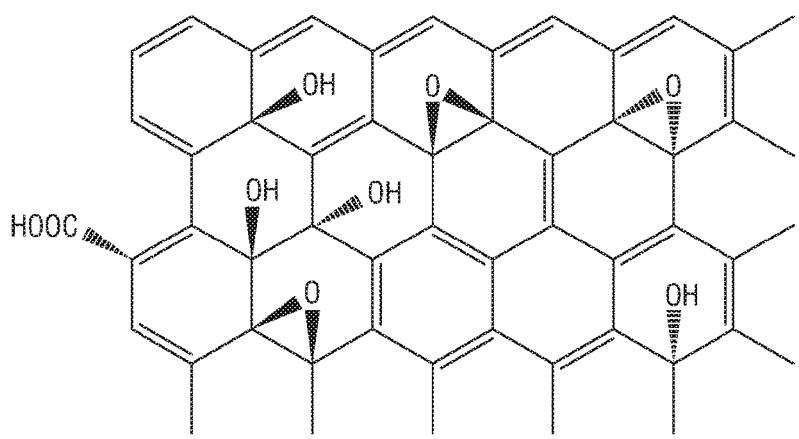
FIG. 5 depicts the chemical structure of an example single layer graphene oxide nanosheet produced according to an embodiment of the disclosure.

FIG. 4 depicts a process 400 for the synthesis of a graphene oxide nanosheet RPM in accordance with an embodiment of the disclosure. As will be appreciated, in some embodiments, a graphene oxide nanosheet may be prepared from graphite powder (block 402) using known techniques. In such embodiments, a graphite power may be converted to graphite via a strong oxidizing agent (SOA). For example, the strong oxidizing agent may be potassium manganate ($KMnO_4$) in sulfuric acid ($H_2SO_4$) and may include sodium nitrate ($NaNO_3$) in the mixture. Next, the graphene oxide may be exfoliated in water using ultrasonication (that is, sonication using ultrasonic waves) to produce graphene oxide having a single layer thickness or a thickness of in the range or two to four layers. FIG. 5 depicts an example single layer graphene oxide nanosheet 500 produced via this technique. As shown in FIG. 5, the graphene oxide nanosheet 500 includes functional groups such as carboxyl (COOH), epoxide (O), and hydroxyl (OH). The carboxyl groups may be present in protonated (COOH) and deprotonated ($COO^-$) forms (not shown).

In other embodiments, a commercially available graphene oxide nanosheet may be obtained (block 404). A "graphene oxide nanosheet" as used herein may include or refer to a bundle of graphene oxide nanosheets. In some embodiments, the graphene oxide nanosheet may be obtained from Techinstro of Nagpu, Maharashtra, India. By way of example, the graphene oxide nanosheet obtained from Techinstro of Nagpu, Maharashtra, India has a composition of 70.5% C, 23% O, 0.4% S, 1.2% H, and 4.9% N, a lateral dimension in the range of 20 nanometers (nm) to 50 microns, and a thickness in the range of 1 nanometer (nm) to 10 microns (μm).

Next, graphene oxide coated wax microspheres may be prepared from the graphene oxide nanosheets (block 406). For example, the graphene oxide nanosheets, deionized water, and hydrochloric acid may be sonicated for about 5 minutes. Wax may be added to the mixture, and the mixture may be heated until the wax is melted (for example, to a temperature of at least 60° C.). The mixture may then be emulsified using a homogenizer. In some embodiments, the homogenizer may be an FJ400-S homogenizer available from Zhejiang L&B Fluid Equipment LTD. Of Zhejiang, China. After emulsification, GO coated wax microspheres may be obtained by filtering the mixture and neutralizing the resulting product with a base (for example, sodium hydroxide (NaOH)).

Next, the exterior surface of the graphene oxide coated wax microspheres may be surface functionalized with an alkylamine using a wax-in-water Pickering emulsion (block 408). The functionalization may be performed by reacting the alkylamine with epoxide groups on the exterior surface of the graphene oxide coated wax microspheres, such that the alkyl group from the alkylamine is bonded to the graphene oxide nanosheet by a nitrogen atom. In some embodiments, the resulting alkyl groups may be C8 to C30 alkyl groups. In some embodiments, the alkylamine may be dodecylamine. In such embodiments, the resulting alkyl group is $C_{12}H_{24}$.

Next, the alkylamine-functionalized graphene oxide coated wax microspheres may be dissolved (block 410) to produce graphene oxide nanosheets having one side that includes alkyl groups (produced by the alkylamine functionalization) and the other side having the groups of the nanosheet. In some embodiments, the alkylamine-functionalized graphene oxide coated wax microspheres may be dissolved using chloroform.

Figure 6:
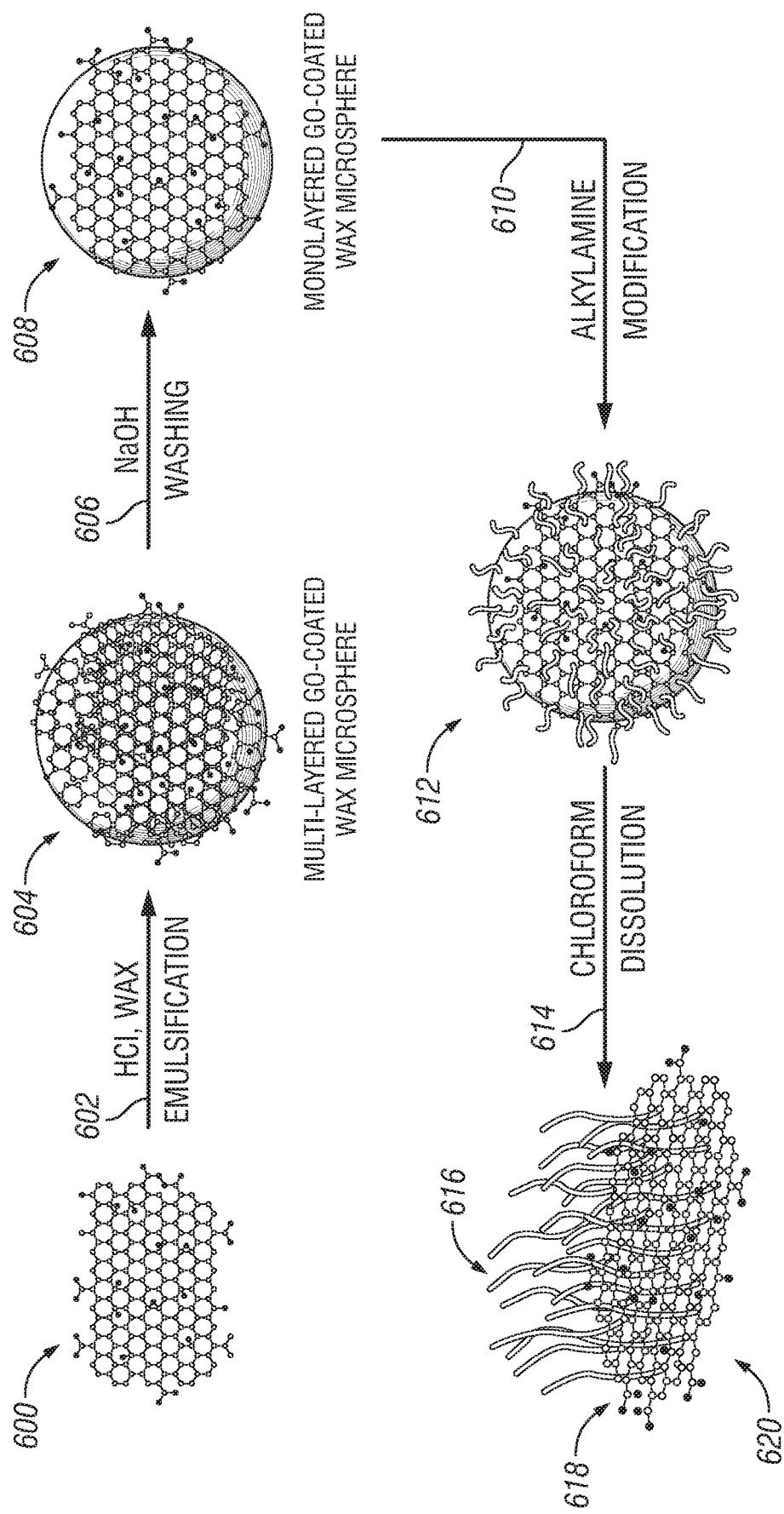
FIG. 6 shows a chemical reaction scheme for preparing and functionalizing graphene oxide coated wax microspheres to produce alkylamine-functionalized graphene oxide nanosheets in accordance with an embodiment of the disclosure.

FIG. 6 illustrates steps 406 and 408 of process 400 in accordance with an embodiment of the disclosure. Initially, graphene oxide nanosheets 600 are mixed with hydrochloric acid (HCl), deionized water, and wax, and the mixture is emulsified (arrow 602). The resulting products are multiplayer graphene oxide coated wax microspheres 604. As shown in FIG. 6, the multiplayer graphene oxide coated wax microspheres 604 may be filtered washed with a base such as sodium hydroxide (NaOH) (arrow 606). The resulting products are single layer graphene oxide coated wax microspheres 608, such one layer of the graphene oxide nanosheets forms the exterior surface of the wax microspheres and is available for the functionalization described in the process 400.

As shown in FIG. 6, the single layer graphene oxide coated wax microspheres 606 are functionalized with an alkylamine (arrow 610). The resulting product is alkylamine-functionalized graphene oxide coated wax microspheres 612 having alkyl groups on the exterior surface from the conversion of the epoxide groups of the outer later via the alkylamine. The alkylamine-functionalized graphene oxide coated wax microspheres may then be dissolved using chloroform (arrow 614) to produce alkylamine-functionalized graphene oxide nanosheets 616 having one side 618 that includes alkyl groups and an opposite side 620 having groups from the original nanosheet (shown in FIG. 5).

The other side of the graphene oxide nanosheets may be functionalized using a chloro-alkyl carboxylic acid to produce a graphene oxide Janus nanosheets RPM as described in the disclosure. As shown in FIG. 4, some of the hydroxyl and epoxide groups on the non-alkylamine functionalized side of the graphene oxide nanosheets may be converted to carboxyl groups using a chloro-alkyl carboxylic acid (Cl-alkyl-COOH) (block 412) to produce the graphene oxide Janus nanosheets RPM. The carboxyl groups may include protonated (COOH) and deprotonated (COO⁻) groups (also referred to as carboxylate groups). Additionally, some of the epoxide groups are converted to negatively charged epoxy (O⁻) groups.

As discussed in the disclosure, hydroxyl groups and epoxide groups may be converted to an oxygen atom, such that the alkyl group from the chloro-alkyl carboxylic acid is bonded to the graphene oxide nanosheet via the oxygen atom and the carboxyl group from the chloro-alkyl carboxylic acid is bonded to the alkyl group. In some embodiments, the chloro-alkyl carboxylic acid may be chloroacetic acid ($ClCH_2COOH$). In such embodiments, the alkyl group bonded to the oxygen atom is methyl ($CH_2$). The reaction with the hydroxyl groups on the alkylamine-functionalized side (that is, the side having alkyl groups) of the graphene oxide nanosheet may be minimized by steric effects.

In some embodiments, for example, an aqueous suspension of the alkylamine-functionalized graphene oxide nanosheets may be mixed with sodium hydroxide (NaOH) and chloroacetic acid ($ClCH_2COOH$), and the mixture may be ultrasonicated to convert the hydroxyl and epoxide groups to carboxyl groups. In some embodiments, the mixture may be ultrasonicated for at least 3 hours. In some embodiments, the aqueous suspension of the alkylamine-functionalized graphene oxide nanosheets may be ultrasonicated before mixing with the sodium hydroxide (NaOH) and chloroacetic acid ($ClCH_2COOH$) to obtain a clear suspension. In some embodiments, the mixture may include equal amounts by mass of sodium hydroxide (NaOH) and chloroacetic acid ($ClCH_2COOH$). After ultrasonication, the suspension having the graphene oxide Janus nanosheets RPM may be neutralized and purified via rinsing and filtration. The suspension may then be dialyzed against distilled water to remove ions and dried in a vacuum at a temperature of at least 65° C.

Figure 7:
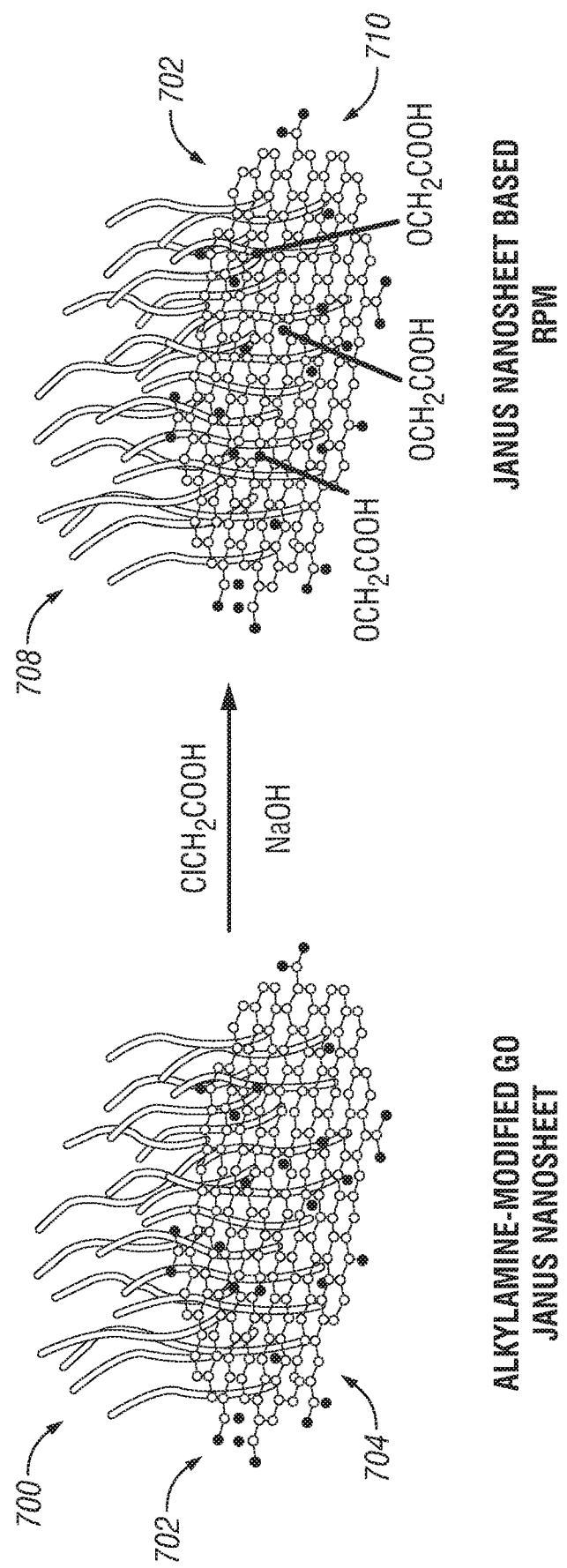
FIG. 7 shows a chemical reaction scheme for functionalizing a side of an alkylamine-functionalized graphene oxide nanosheets using chloroacetic acid in accordance with an embodiment of the disclosure.

FIG. 7 illustrates steps 412 of the process 400 in accordance with an example embodiment of the disclosure. Alkylamine-functionalized graphene oxide nanosheets 700 having one side 702 functionalized with alkylamine to produce alkyl groups and a non-functionalized opposite side 704 are functionalized using chloroacetic acid ($ClCH_2COOH$) in a mixture that also includes sodium hydroxide (NaOH) (arrow 706). The resulting product is a graphene oxide Janus nanosheets RPM 708 having one side 702 functionalized with alkylamine to produce alkyl groups and the opposite side 710 having carboxylate groups converted from the hydroxide and epoxide groups of the graphene oxide nanosheets.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A graphene oxide Janus nanosheet relative permeability modifier (RPM) for carbonate formations, comprising:

a graphene oxide nanosheet having a first side and a second side;

a first alkyl group bonded to the first side, wherein the first alkyl group is selected from the group consisting of a C1-C8 alkyl, wherein the first alkyl group is bonded to the first side by an oxygen atom;

a functional group bonded to the first alkyl group, the functional group selected from the group consisting of COOH, COO$^-$, OH, and O$^-$; and a second alkyl group bonded to the second side, wherein the second alkyl group is selected from the group consisting of a C8-C30 alkyl, wherein the second alkyl group is bonded to the second side by a nitrogen atom.

2. The graphene oxide Janus nanosheet RPM of claim 1, wherein the degree of hydrophobic alkyl functionality of the second side is in the range of 0.01 weight (wt) % to 20 wt % based on the second side.

3. The graphene oxide Janus nanosheet RPM of claim 1, wherein the graphene oxide nanosheet has a thickness in the range of 1 nanometer (nm) to 10 microns (μm).

4. The graphene oxide Janus nanosheet RPM of claim 1, wherein the graphene oxide nanosheet has a lateral dimension in the range of 20 nanometers (nm) to 50 microns.

\* \* \* \* \*